United States Patent
Wendel et al.

(10) Patent No.: US 10,540,284 B2
(45) Date of Patent: Jan. 21, 2020

(54) CACHE-COHERENT MULTIPROCESSOR SYSTEM AND A METHOD FOR DETECTING FAILURES IN A CACHE-COHERENT MULTIPROCESSOR SYSTEM

(71) Applicants: Dirk Wendel, Grasbrunn (DE); Oliver Bibel, Grasbrunn (DE); Joachim Fader, Munich (DE); Wilhard Christophorus Von Wendorff, Munich (DE)

(72) Inventors: Dirk Wendel, Grasbrunn (DE); Oliver Bibel, Grasbrunn (DE); Joachim Fader, Munich (DE); Wilhard Christophorus Von Wendorff, Munich (DE)

(73) Assignee: NXP USA, Inc., Austin, TX (US)

( * ) Notice: Subject to any disclaimer, the term of this patent is extended or adjusted under 35 U.S.C. 154(b) by 624 days.

(21) Appl. No.: 14/445,237

(22) Filed: Jul. 29, 2014

(65) Prior Publication Data

US 2016/0034398 A1 Feb. 4, 2016

(51) Int. Cl.
*G06F 12/0831* (2016.01)
*G06F 12/14* (2006.01)
*G06F 12/084* (2016.01)
*G06F 12/0811* (2016.01)

(52) U.S. Cl.
CPC ........ *G06F 12/0831* (2013.01); *G06F 12/084* (2013.01); *G06F 12/1458* (2013.01); *G06F 12/0811* (2013.01); *G06F 2212/1024* (2013.01); *G06F 2212/1032* (2013.01)

(58) Field of Classification Search
CPC ..... G06F 11/1629–1654; G06F 12/1458–1491
See application file for complete search history.

(56) References Cited

U.S. PATENT DOCUMENTS

| | | | | |
|---|---|---|---|---|
| 5,931,938 A * | 8/1999 | Drogichen | ........ | G06F 15/17375 712/15 |
| 6,151,689 A * | 11/2000 | Garcia | ................ | G06F 11/1482 714/18 |
| 6,449,699 B2 * | 9/2002 | Franke | ................ | G06F 12/1458 711/147 |

(Continued)

OTHER PUBLICATIONS

Borodin et al. "A Low-Cost Cache Coherence Verification Method for Snooping Systems." 2008. IEEE. 11th EUROMICRO Conference on Digital System Design Architectures, Methods and Tools. pp. 219-227.*

(Continued)

*Primary Examiner* — Nathan Sadler (57) ABSTRACT

A cache-coherent multiprocessor system comprising processing units, a shared memory resource accessible by the processing units, the shared memory resource being divided into at least one shared region, at least one first region, and at least one second region, a first cache, a second cache, a coherency unit, and a monitor unit, wherein the monitor unit is adapted to generate an error signal, when the coherency unit affects the at least one first region due to a memory access from the second processing unit and/or when the coherency unit affects the at least one second region due to a memory access from the first processing unit, and a method for detecting failures in a such a cache-coherent multiprocessor system.

19 Claims, 5 Drawing Sheets

(56) References Cited

U.S. PATENT DOCUMENTS

| | | | | |
|---|---|---|---|---|
| 8,732,408 | B2* | 5/2014 | Karlapalem | G06F 12/0815 |
| | | | | 711/141 |
| 9,170,963 | B2* | 10/2015 | Han | G06F 13/24 |
| 2002/0152420 | A1* | 10/2002 | Chaudhry | G06F 11/1641 |
| | | | | 714/11 |
| 2007/0156987 | A1* | 7/2007 | Chen | G06F 12/1458 |
| | | | | 711/163 |
| 2009/0113141 | A1* | 4/2009 | Bullman | G06F 12/1483 |
| | | | | 711/147 |
| 2013/0174224 | A1* | 7/2013 | Ueki | G06F 12/1466 |
| | | | | 726/4 |
| 2014/0223052 | A1* | 8/2014 | Chavali | G06F 13/1605 |
| | | | | 710/110 |

OTHER PUBLICATIONS

Pádraig Brady. "Updating the Bios using linux." Jun. 2013. https://web.archive.org/web/20130601052750/http://www.pixelbeat.org/docs/bios/.*

Hattendorf, A. et al., "Shared Memory Protection for Spatial Separation in Multicore Architectures", 7th IEEE International Symposium on Industrial Embedded Systems (SIES); Jun. 20-22, 2012; pp. 299-302.

Ho, N. et al., "A Hardware/Software Approach to Detect Memory Corruptions in Embedded Systems", 2010 IEEE International Conference on Advanced Technologies for Communications (ATC); Oct. 20-22, 2010; pp. 285-290.

\* cited by examiner

CACHE-COHERENT MULTIPROCESSOR SYSTEM AND A METHOD FOR DETECTING FAILURES IN A CACHE-COHERENT MULTIPROCESSOR SYSTEM

FIELD OF THE INVENTION

This invention relates to a cache-coherent multiprocessor system and a method for detecting failures in a cache-coherent multiprocessor system.

BACKGROUND OF THE INVENTION

Computer programmes comprising executable programme code may be executed by at least one processing unit of a processor system. The execution of the programme code may be accelerated by using a hierarchical memory architecture comprising several memory resources providing different access times. Code and data portions of the executable programme code may be loaded into a memory resource having a small access time. The memory resource having the small access time may be called cache and loading code and data portions into said cache may be called caching.

A further possibility to accelerate the execution of programme code may be a parallelisation by using a plurality of processing units that execute instructions of the programme code parallel to each other. A processor system comprising a plurality of processing units may be called multiprocessor system. Each of said plurality of processing units may access to a specific cache that is exclusively related to a specific processing unit. This may, for example, be realised by providing a first cache that is exclusively dedicated to a first processing unit and a second cache that is exclusively dedicated to a second processing unit. However, the result of the executed programme code has to provide predictable results that are independent from the parallelisation, e.g., the number of processing units. Therefore, the caches of the plurality of processing units of the processor system must be cache-coherent, e.g., the cached data/instructions have to be consistent when used for a calculation. Providing cache coherence may require the alteration of the first cache of the first processing unit due to a change within the second cache of the second processing unit. In this way, a failure within the second processing unit may affect the first processing unit due to the cache coherence of the multiprocessor system. A multiprocessor system that is kept cache-coherent may be called a cache-coherent multiprocessor system.

In safety critical applications, e.g., according to ISO 26262, IEC 61508, or EN 50128/9, one common approach for reaching given safety requirements is to execute two instances of software on different processing units, wherein both instances execute basically similar programme codes. The results are compared to detect failures in the processing units. However, a failure in a processing unit may spread through the whole processor system due to the coherency of the shared memory resource when a cache-coherent multiprocessor system is used.

Hattendorf A., Raabe A., Knoll A., "Shared Memory Protection for Spatial Separation in Multicore Architectures", Industrial Embedded Systems (SIES), 2012, 7$^{th}$ IEEE International Symposium on, pp 299-302, 20-22 Jun. 2012 describes different architectures of multi-core computer systems using memory protection units (MPU) or memory management units (MMU). The advantages and draw-backs of the mentioned architectures are summarized.

Nam Ho, Anh-Vu Dinh-Duc, "A Hardware/Software Approach to Detect Memory Corruptions in Embedded Systems", Advanced Technologies for Communications (ATC), 2010 International Conference on, pp 285-290, 20-22 Oct. 2010 describes a method to detect memory corruptions in a debugging phase at run-time for embedded systems without a MMU.

SUMMARY OF THE INVENTION

The present invention provides a cache-coherent multiprocessor system and a method for detecting failures in a cache-coherent multiprocessor system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings alike reference numbers are used to identify alike or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated for the understanding and appreciation of the underlying concepts of the present invention and in order to not obfuscate or distract from the teachings of the present invention.

Although the definition of terms hereinafter used should not be construed as limiting, the terms as used are understood to comprise at least the following.

The term "cache-coherent" may be used to describe that data/instructions stored in caches from a shared memory resource are consistent when used for a calculation, wherein the caches are related to different processing units of a multiprocessor system. A cache that is related to a specific processing unit may be called a local cache. A local cache that is related to a specific processing unit may, for example, be exclusively dedicated to said processing unit. A cache that is exclusively dedicated to a specific processing unit may, for example, be fully integrated into the processing unit. Storing/loading data/instructions into local caches from a shared memory resource may generate copies of the stored/loaded data/instructions. The stored/loaded data/instructions may be called cached data/instructions. When a copy of cached data/instructions is altered, all other copies and the original become outdated and they have to be changed/updated to secure consistency/coherency before they can be used as basis for further calculations. Any further calculation has to be based on the already altered data/instructions. Avoiding outdated data/instructions from being used as basis for further calculations may be secured by marking them, for example with an additional bit indicating that they must be updated before they can be used.

The term "processing unit" may be used for a programmable microprocessor having at least one execution unit for executing instructions of a programme code.

The term "programme code" may be used for a sequence of instructions that may represent a computer programme. The computer programme may comprise machine code and may be executed by the processing unit of the processor system. The machine code of the computer programme may, for example, comprise write instructions and read instructions for accessing a shared memory resource of the processor system. Write instructions may alter parts of the shared memory resource by writing information to the shared memory resource, and read instructions may retrieve information from the shared memory resource.

The term "memory access" may be used for either an execution of a read instruction or an execution of a write instruction. The memory access may affect the accessed memory when a write instruction is executed. A memory access that affects the accessed memory may alter the stored data/instructions. The memory access may not affect the accessed memory when a read instruction is executed.

The term "shared memory resource" may refer to a memory resource commonly used by different processing units of the multiprocessor system, wherein the term "commonly used" may refer to reading/writing data/instructions from and to the shared memory resource such that each of the different processing units may alter the shared memory resource. The shared memory resource may be accessible via a consecutive address space that may be used for accessing specific parts/regions of the shared memory resource. The shared memory resource, may, for example, be the random access memory (RAM) of the multiprocessor system.

The term "shared region" may be used for a region/part of the shared memory resource that may be simultaneously cached in different caches that are related to or dedicated to different processing units of a multiprocessor system. The different processing units may, for example, be a first processing unit and a second processing unit of a cache-coherent multiprocessor system.

The term "cache" may be used for a memory related to or dedicated to a specific processing unit of the multiprocessor system. The cache may have a small latency time providing high performance on write and read instructions. The cache may be used for buffering parts of the programme code or data that are often used for accelerating the overall execution performance of the cache-coherent multiprocessor system.

The term "first region" may be used for a region of the shared memory resource that is exclusively related to the first processing unit. The first region may, for example, be dedicated or assigned to the first processing unit.

The term "second region" may be used for a region of the shared memory resource that is exclusively related to the second processing unit. The second region may, for example, be dedicated or assigned to the second processing unit. The processing units may be connected to the shared memory resource via the caches that are exclusively related to them such that all accesses to the shared memory resource may be handled via the caches. However, a direct access to the shared memory resource may be optionally realized.

The term "coherency unit" may be used for a plurality of integrated circuits, for example, a specific block within a microchip that secures the coherency of the data/instructions stored in the first cache and the second cache when a processing unit accesses them for further calculations. The coherency unit may be part of an integrated microcontroller. The coherency unit may, for example, use a directory-based method, a snooping method, or a snarfing method for securing the cache coherency. The coherency unit may, for example, comprise or control a memory bus.

The term "monitor unit" may be used for a plurality of integrated circuits, for example, a specific block within a microchip that may, for example, continuously check accesses to the shared memory resource and/or the caches. The monitor unit may be part of an integrated microcontroller. The monitor unit may, for example, be supervising a memory controller managing the memory accesses. For example, the monitor unit may check whether a region of the shared memory resource that is assigned exclusively to a specific processing unit is altered by another processing unit and/or vice versa. A region of the shared memory resource that is assigned exclusively to a specific processing unit may be accessible by another processing unit. In particular, another processing unit may have read/write access to the region of the shared memory resource that is assigned exclusively to the specific processing unit via the memory controller such that data/instructions stored in said region may be unintentionally altered. The monitor unit may recognize this unintended alteration by supervising the memory controller and the memory accesses.

A single core processing unit may be a central processing unit having just one central processing unit (core) that executes programme instructions. The instructions may, for example, be ordinary instructions such as add, move data, and branch. A multi-core processing unit may have two or more independent cores that may execute multiple instructions at the same time for increasing overall execution speed. The two or more independent cores may be arranged on a single integrated circuit die or may be arranged on multiple dies in a single chip package or in multiple chip packages.

A region of the shared memory resource may be defined by a lower boundary and an upper boundary. The lower boundary and the upper boundary may be represented by address values within an address space that may be used for representing and addressing specific parts/regions of the shared memory resource. For example, the address space may be consecutive and each address value that falls within an address region defined by the lower boundary and the upper boundary of said consecutive address space may be viewed as representing a part of the defined region.

Figure 1:
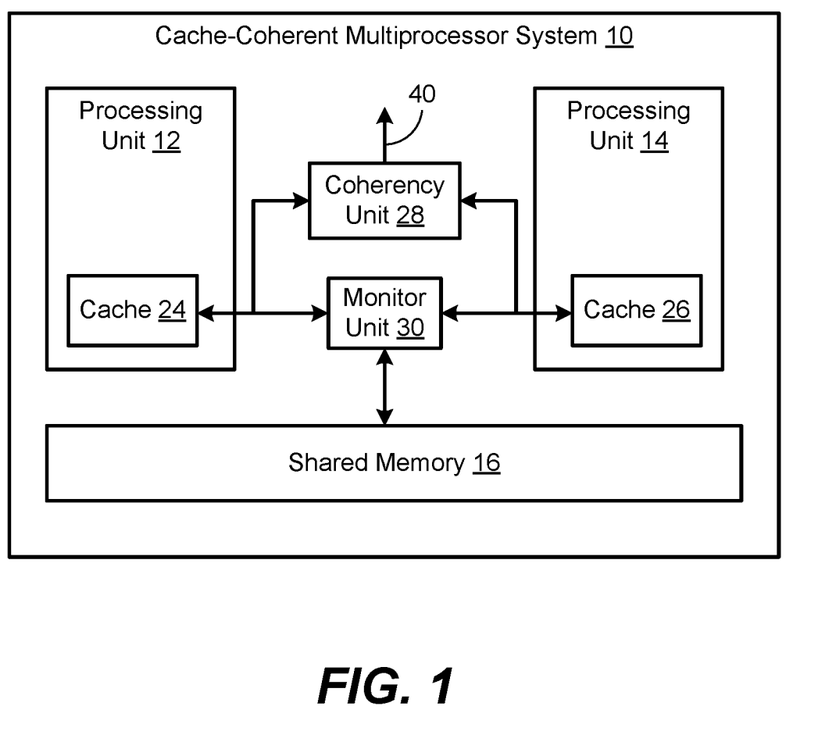
FIG. 1 schematically shows an example of an embodiment of a cache-coherent multiprocessor system.

Now referring to FIG. 1, an example of an embodiment of a cache-coherent multiprocessor system is schematically shown. The cache-coherent multiprocessor system 10 may comprise a first processing unit 12 and a second processing unit 14. Additional processing units, for example a third processing unit that may be similar to the first/second processing unit 12, 14, may be present. The first processing unit 12 may have a first cache 24 that may be related to the first processing unit 12. For example, the first cache 24 may be dedicated or assigned to the first processing unit 12. The second processing unit 14 may have a second cache 26 that may be related to the second processing unit 14. For example, the second cache 26 may be dedicated or assigned to the second processing unit 14. The first cache 24 may, for example, be integrated into the first processing unit 12. For example, the first cache 24 may be located on a single die comprising the first processing unit 12 and the first cache 24. The second cache 26 may, for example, be integrated into the second processing unit 14. For example, the second cache 26 may be located on a single die comprising the second processing unit 14 and the second cache 26. The cache-coherent multiprocessor system 10 may comprise a shared memory resource 16. The shared memory-resource 16 may be commonly used and accessed by the first processing unit 12 and the second processing unit 14. The first processing unit 12 may access to the shared memory resource 16 via the first cache 24. The second processing unit 14 may access to the shared memory resource 16 via the second cache 26. The cache-coherent multiprocessor system 10 may comprise a coherency unit 28 that may, for example, secure the cache coherency of cached regions of the shared memory resource, e.g., the consistency of data/instructions that are cached in the first cache 24 and the second cache 26. The coherency unit 28 may, for example, supervise/restore the consistency of a cached region that is cached in the first cache 24 and the second cache 26. The coherency unit may, for example comprise an intelligent memory bus for controlling/providing memory accesses to the shared memory resource 16, the first cache 24 and/or the second cache 26. The first processing unit 12 and the second processing 14 unit may directly access the shared memory 16 via said intelligent memory bus. It may be possible to have different copies of a cached region of the shared memory resource 16 when the first cache 24 is exclusively related to or dedicated to the first processing unit 12 and the second cache 26 is exclusively related to or dedicated to the second processing unit 14. When a first copy of the cached region that is stored in the first cache 24 is altered by the first processing unit 12, the coherency unit 28 may mark and/or update the corresponding copy of the cached region in the second cache 26 to manage such conflicts and maintain consistency between cache and memory. In this way using coherent data/instructions by different processing units may be secured. Further, the cache-coherent multiprocessor system 10 may comprise a monitor unit 30 that may monitor read- and/or write-accesses to the shared memory resource 16. The functionality of said monitor unit 30 will be explained in connection with the method for detecting failures in a cache-coherent multiprocessor system 10. The monitor unit 30 may be adapted to send an error signal 40 when an unexpected access to the shared memory resource 16 is detected. The error signal 40 may, for example, be an interrupt to a core of the first processing unit 12 and/or to a core of the second processing unit 14. Alternatively/additionally, the signal 40 may be evaluated in at least one separated error handling module. An unexpected access to the shared memory resource may, for example, be a memory access from the second processing unit 14 for writing data/instructions, wherein the memory access is directed to a region of the shared memory resource 16 that is exclusively assigned for the first processing unit 12. The coherency unit 28 may use any method for securing cache coherency known to a person skilled in the art. The coherency unit 28 may, for example, be adapted to execute a directory-based method and/or a snooping method and/or a snarfing method. The cache-coherent multiprocessor system 10 may, for example, be adapted to execute two instances of software that basically perform similar tasks, wherein the result of both instances are compared to each other for validating the result (reciprocal comparison). Said two instances of software may be executed separate from each other by the first processing unit 12 and the second processing unit 14. The first processing unit 12 may, for example, execute the first instance of software, and the second processing unit 14 may, for example, execute the second instance of software. The separate execution of said two instances may be called free from interference when a failure of the first processing unit 12 cannot cause a failure of the second processing unit 14 and vice versa. "Freedom from interference" must be shown for fulfilling several norms, for example, ISO 26262. The monitor unit 30 may not prevent but recognize an error that violates the freedom from interference.

Figure 2:
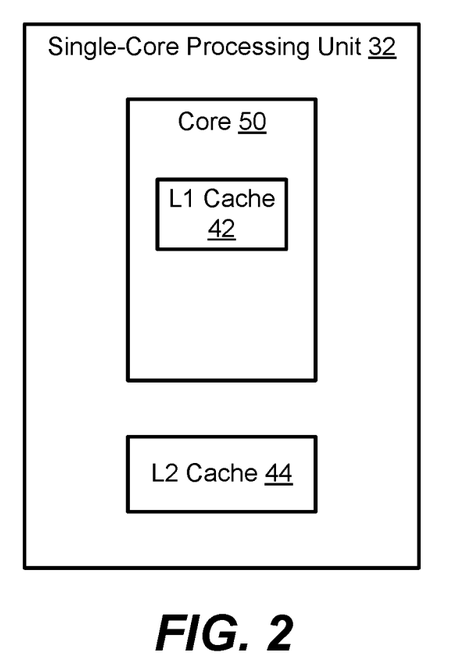
FIG. 2 schematically shows an example of an embodiment of a single-core processing unit.

Now referring to FIG. 2, an example of an embodiment of a single-core processing unit is schematically shown. The single-core processing unit 32 may comprise a core 50. The core 50 may comprise an L1 cache 42. An L2 cache 44 may be optionally integrated into the single-core processing unit 32. The L1 cache 42 may, for example, operate at full clock rate, wherein the L2 cache 44 may, for example, operate at half clock rate. The L1 cache 42 may be smaller than the L2 cache 44. The L1 cache 42 and the L2 cache 44 may be a hierarchical cache architecture that may be identified with the first cache 24 shown in FIG. 1 when the first processing unit 12 described in connection with FIG. 1 is a single-core processing unit.

Figure 3:
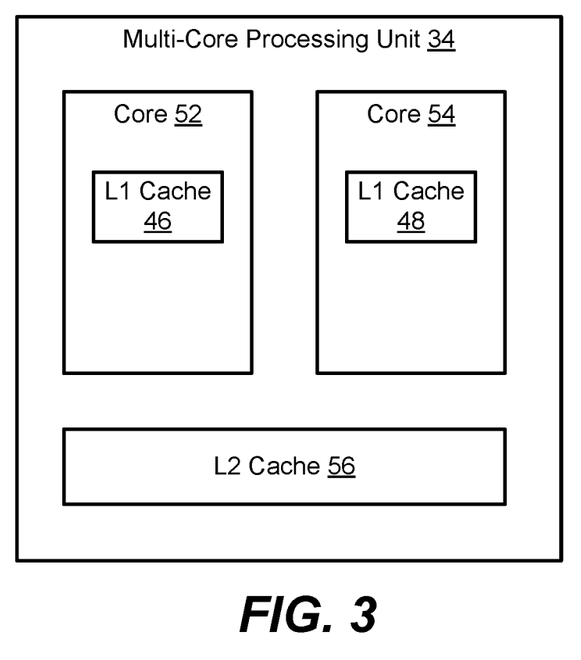
FIG. 3 schematically shows an example of an embodiment of a multi-core processing unit.

Now referring to FIG. 3, an example of an embodiment of a multi-core processing unit is schematically shown. The multi-core processing 34 unit may comprise a first core 52 and a second core 54. The first core 52 may comprise a first L1 cache 46 that is exclusively related to or dedicated to the first core 52. The second core 54 may comprise a second L1 cache 48 that is exclusively related to or dedicated to the second core 54. Further, the multi-core processing unit 34 may optionally comprise a common/shared L2 cache 56. The first L1 cache 46, the second L1 cache 48, and the common/shared L2 cache 56 may represent a hierarchical cache structure that may be identified with the second cache 26 shown in FIG. 1 when the second processing unit 14 described in connection with FIG. 1 is a multi-core processing unit. The first L1 cache 46, the second L1 cache 48 and the common/shared L2 cache 56 of the multi-core processing unit 34 have to be coherent to each other. The first L1 cache 46 and the second L1 cache 48 may, for example, be kept coherent by a further coherency unit not shown in FIG. 3. The common/shared L2 cache 56 may or may not be the source of the common copy of data/instructions. For example, data/instructions might be read from a shared memory resource outside of the multi-core processing unit 34, stored in the first L1 cache 46 and altered there. When the second L1 cache 48 accesses this data/instructions, the further coherency unit needs to ensure to get the altered copy out of the first L1 cache 46. The basic setup of the multi-core processing unit 34 may be identical with the setup of the single-core processing unit 32 shown in FIG. 2. However, the multi-core processing unit 34 may execute instructions in parallel. The multi-core processing unit 34 may apply a method according to the present invention to secure a cache-coherent hierarchical cache structure. Further, the multi-core processing unit 34 may be viewed as kind of cache-coherent multiprocessor system.

Figure 4:
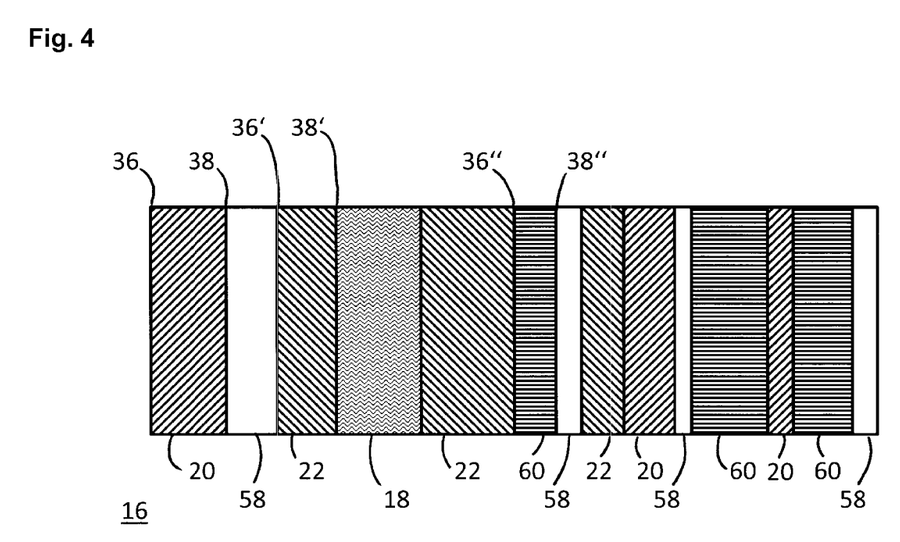
FIG. 4 schematically shows an example of an embodiment of a shared memory resource.

Now referring to FIG. 4, an example of an embodiment of a shared memory resource is schematically shown. The shared memory resource 16 may be represented/accessed via a set of consecutive memory addresses. The shared memory resource 16 may be statically or dynamically divided into at least one first region 20, at least one second region 22, at least one shared region 18, and at least one uncached region 60. The at least one first region 20 may be assigned to the first processing unit, and the at least one second region 22 may be assigned to the second processing unit 14. That is to say the at least one first region 20 may be cached for the first processing unit 12 by the first cache 24. The at least one second region 22 may be cached for the second processing unit 14 by the second cache 26. The at least one shared region 18 may be cached simultaneously for the first processing unit 12 by the first cache 24 and for the second processing unit 14 by the second cache 26. Further, the shared memory resource 16 may contain at least one unused region 58. The at least one unused region 58 may contain neither data nor instructions, e.g., the at least one unused region 58 may be empty. The at least one uncached region 60 may contain data/instructions that should not be cached, for example, address regions of I/O devices. The at least one first region 20, the at least one second region 22, the at least one shared region 18, the at least one unused region 58, and the at least one uncached region 60 may be separated from each other by boundaries, wherein each boundary may be represented by a specific address value from the consecutive address space that may be used for accessing/representing the shared memory resource 16. For example, a pair consisting of a lower boundary 36, 36', 36" and an upper boundary 38, 38', 38" may define a specific region within the shared memory resource 16. The at least one first region 20 may be cached by the first cache 24 described in connection with FIG. 1, e.g., the data/instructions stored within the first region 20 may be loaded into the first cache 24 to accelerate the execution of the programme code. Similarly, the data/instruction stored in the at least one second region 22 may be loaded into the second cache 26. Further, the data/instructions stored in the at least one shared region 18 may be simultaneously loaded into the first cache 24 and the second cache 26 and/or accessible by the first processing unit 12 and the second processing unit 14. The lower boundary and the upper boundary of a specific region, e.g., the first region 20, may be initially set when the execution of a program code starts. The boundaries may be optionally altered at run-time. Altering a specific boundary may implicitly alter two regions when the altered upper/lower boundary is identical with a lower/upper boundary of another region lying adjacent.

Figure 5:
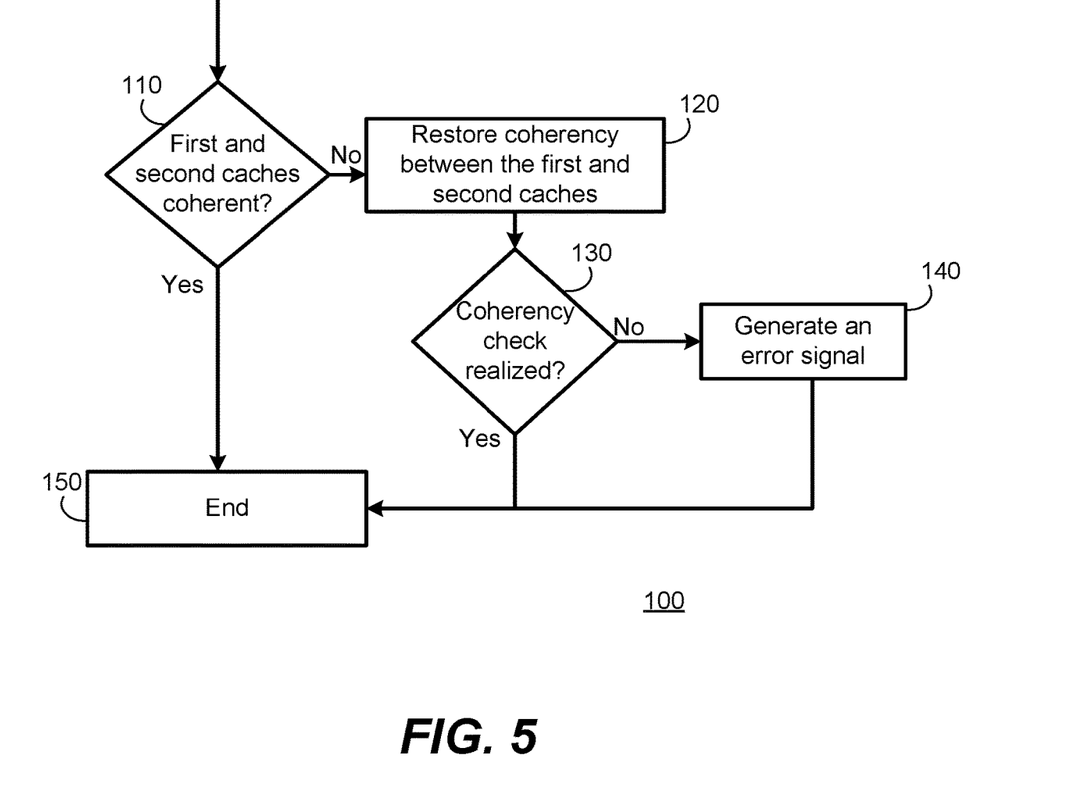
FIG. 5 schematically shows a flow diagram of a method for detecting failures in a cache-coherent multiprocessor system.

Now referring to FIG. 5, a flow diagram of a method for detecting failures in a cache-coherent multiprocessor system is schematically shown. The method 100 may start at point 110. At point 110, the cache-coherency of the first cache and the second cache may be checked/monitored. Checking/monitoring the cache-coherency may be executed by the coherency unit and/or the monitor unit. When the stored data/instructions are consistent to each other, the method 100 may resume at point 150. When the first cache and the second cache are inconsistent, the coherency may be restored and/or it may be secured that incoherent data/instructions are updated before using at point 120. The latter may be realized by marking incoherent data/instructions as "dirty" or outdated. Restoring the coherency and/or securing that incoherent data/instructions are updated before using may, for example, be executed/initiated by the coherency unit. The data/instructions may become incoherent due to a memory access that affects stored data/instructions. Restoring/securing the coherency may affect a specific region of the shared memory resource and/or copies thereof that are loaded into the first cache and/or the second cache. Loading a specific region of the shared memory resource into the first cache and the second cache may generate copies of the loaded region. When a copy of the loaded region is altered, for example by a write instruction, all other copies and the original stored at the shared memory resource have to be updated before they are used again. That is to say, restoring/securing coherency may affect the loaded region and/or all copies of said loaded region. The method 100 may subsequently continue at point 130. At point 130, checking/supervising coherency may be realized. The checking/supervising may be executed, for example, by the monitoring unit. When the first region or the second region is affected due to the execution of a write instruction, it may be checked whether the accessed region, e.g., the first region or the second region, is assigned to the accessing data processing unit. When the affected region is not assigned to the accessing data processing unit, a failure is detected that may propagate, and the method 100 proceeds at point 140. An error signal may be sent to inform/warn. The error signal may, for example, be an interrupt. Sending the error signal may, for example, be executed by the monitoring unit. The error signal may be processed further. For example, said error signal may be caught by a hardware exception mechanism that may execute further actions. These actions may include a hardware reset of the cache-coherent multiprocessor system, a shutdown of the cache-coherent multiprocessor system and/or repeating the instruction that caused the error signal and checking whether the detected error continues to exist. The method 100 may resume at point 150. The method 100 may directly jump from point 130 to point 150 without generating said error signal at point 140 when an unexpected memory access is not detected while restoring cache coherency. The unexpected memory accesses may, for example, be detected via checking whether restoring coherency requires an access to the shared memory resource based on the upper and lower boundaries of the at least one first region and the at least one second region.

Figure 6:
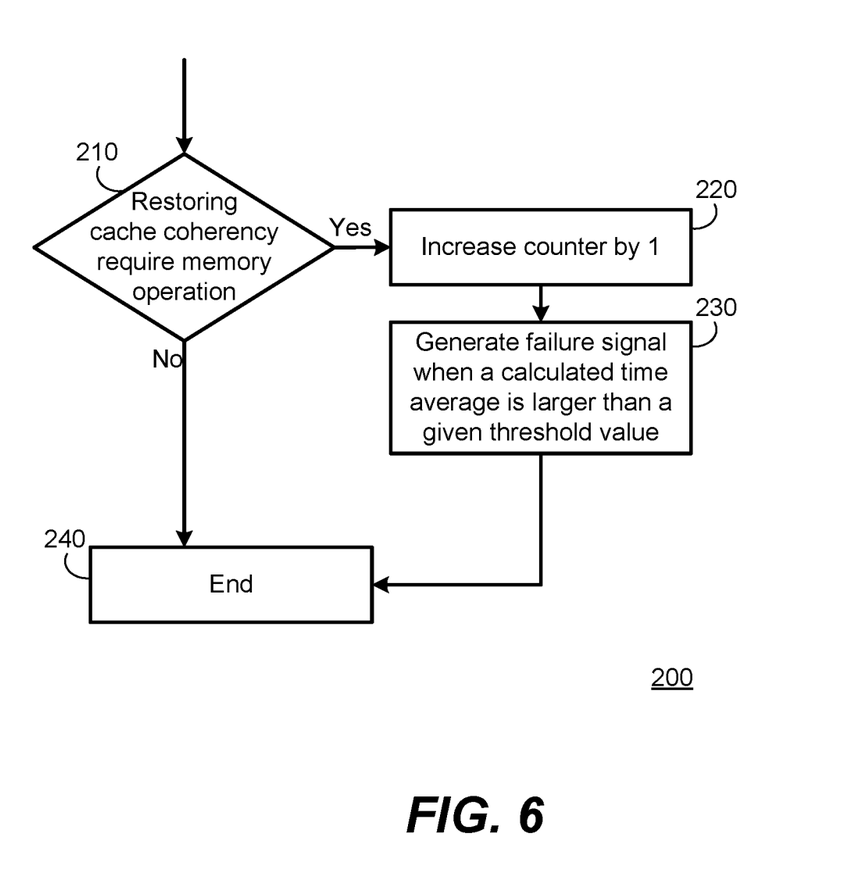
FIG. 6 schematically shows a flow diagram of a method for monitoring a rate of coherency operations.

Now referring to FIG. 6, a flow diagram of a method for monitoring a rate of coherency operations is schematically shown. The method 200 may start at point 210. At point 210 the method 200, that may, for example, be executed by the monitoring unit and/or the coherency unit may check whether restoring cache coherency may require a least one memory operation that accesses the at least one first region and/or the at least one second region or copies thereof in local caches. This checking may, for example, be realized by comparing the memory addresses used for accessing the shared memory resource with the upper and lower boundaries of the at least one first region and the at least one second region. When this check is negative, e.g., restoring coherency does not require at least one memory operation using memory addresses within the at least one first regions and the at least one second regions, the method 200 may resume at point 240. The checking may, for example, be executed by the monitoring unit and/or the coherency unit. Optionally, the first cache and/or the second cache may provide additional circuitry logic for independently executing abovementioned calculations. Otherwise, the method 200 may continue at point 220. At point 220, a counter may be increased by 1. Further a time average may be calculated. The time average may define the rate of memory accesses that are related to restoring maintaining coherency between the caches. There may be separate counters for the first processing unit and the second processing unit for differentiating between memory accesses caused by a change in the first cache related to the first processing unit and memory accesses caused by a change in the second cache related to the second processing unit. Increasing the counter and/or calculating the time average may, for example, be executed by the monitoring unit. The method 200 may continue at point 230. At point 230, checking whether the calculated time average is larger than a given threshold value may be executed. When the calculated time average is larger than the given threshold value, the method 200 may, for example, generate a failure signal, for example an interrupt, and proceed at point 240. Otherwise, the method 200 may directly proceed at point 240. Generating said failure signal due to an increased memory access for restoring coherency may, for example, lead to the deceleration of the processing unit that caused said memory access. In this way, a "babbling idiot" scenario between the different processing units, e.g., the first processing unit and the second processing unit, of the cache-coherent multiprocessor system may be detected. The method 200 may be part of the method 100 previously described in connection with FIG. 5.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions and data such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. In particular, such computer-readable storage media are non-transitory, tangible. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

For example, the L1 cache and the L2 cache single-core of the single-core processing unit as well as the L1 caches and the L2 cache of the multi-core processing unit may be either integrated into the core/cores or separated. Additional caches may be easily implemented optionally adding further cache levels to the hierarchical cache structure.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. For example, the described method for detecting failures and the related method for dealing with the babbling idiot scenario may be applied to the hierarchical cache structure of the multi-core processing unit.

Also for example, in one embodiment, the illustrated examples may be implemented as circuitry located on a single integrated circuit or within a same device. For example, the first core of the multi-core processing unit and the second core of the multi-core processing unit. Alternatively, the examples may be implemented as any number of separate integrated circuits or separate devices interconnected with each other in a suitable manner. For example, the first processing unit and the second processing unit may be arranged on separate dies that are interconnected by a bus.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A cache-coherent multiprocessor system comprising
a first processing unit and a second processing unit,
a shared memory resource accessible by the first processing unit and the second processing unit, the shared memory resource being divided into a shared region, a first region assigned to the first processing unit, and a second region assigned to the second processing unit,
a first cache related to the first processing unit,
a second cache related to the second processing unit,
a coherency unit adapted to secure the cache-coherency of the cache-coherent multiprocessor system, to determine that a first copy of data stored in the first cache is altered, to update an original copy of the data stored in the shared region to match the altered first copy of data in response to the first copy of data being altered, and to update a second copy data stored in the second cache to match the altered first copy of data and the updated original copy of the data in response to the first copy being altered, and
a monitor unit adapted to generate an error signal, when the coherency unit affects the first region due to a memory access from the second processing unit and when the coherency unit affects the second region due to a memory access from the first processing unit.

2. The cache-coherent multiprocessor system as claimed in claim 1, wherein the first processing unit is a single-core processing unit or a multi-core processing unit.

3. The cache-coherent multiprocessor system as claimed in claim 1, wherein the second processing unit is a single-core processing unit or a multi-core processing unit.

4. The cache-coherent multiprocessor system as claimed in claim 1, wherein the first processing unit and the second processing unit are adapted to dynamically shift a boundary of the shared region.

5. The cache-coherent multiprocessor system as claimed in claim 1, wherein the first processing unit is adapted to dynamically shift a boundary of the first region and a boundary of the second region.

6. The cache-coherent multiprocessor system as claimed in claim 1, wherein the second processing unit is adapted to dynamically shift a boundary of the second region and a boundary of the first region.

7. The cache-coherent multiprocessor system as claimed in claim 1, wherein the coherency unit and the first cache are adapted to monitor a rate of coherency operations.

8. A method for detecting failures in a cache-coherent multiprocessor system comprising:
a first processing unit and a second processing unit,
a shared memory resource accessible by the first processing unit and the second processing unit, the shared memory resource being divided into a shared region, a first region assigned to the first processing unit, and a second region assigned to the second processing unit, a first cache related to the first processing unit,
a second cache related to the second processing unit,
a coherency unit, and
a monitor unit,
said method comprising:
securing, by the coherency unit, the cache-coherency of the cache-coherent multiprocessor system,
determining, by the coherency unit, that a first copy of data stored in the first cache is altered,
updating, by the coherency unit, an original copy of the data stored in the shared region to match the altered first copy of data in response to the first copy being altered,
updating, by the coherency unit, a second copy of the data stored in the second cache to match the altered first copy of data and the updated original copy of the data in response to the first copy being altered, and
generating, by the monitor unit, an error signal, when the coherency unit affects the first region due to a memory access from the second processing unit and when the coherency unit affects the second region due to a memory access from the first processing unit.

9. The method as claimed in claim 8, further comprising:
at least one of the first processing unit and the second processing unit, dynamically shifting a boundary of the shared region.

10. The method as claimed in one of claim 8, further comprising:
the first processing unit, dynamically shifting a boundary of the first region and a boundary of the second region.

11. The method as claimed in claim 8, further comprising:
the second processing unit, altering a boundary of the second region and a boundary of the first region.

12. The method as claimed in one of claim 8, further comprising:
the coherency unit, monitoring a rate of coherency operations.

13. The method of claim 8, further comprising:
executing, by the first processing unit, a first instance of software,
executing, by the second processing unit, a second instance of the software, and
validating the results between execution of both the first instance and the second instance.

14. A non-transitory, tangible computer-readable storage medium having stored thereon a computer program for detecting failures in a cache-coherent multiprocessor system comprising:
a first processing unit and a second processing unit,
a shared memory resource accessible by the first processing unit and the second processing unit, the shared memory resource being divided into a shared region, a first region assigned to the first processing unit, and a second region assigned to the second processing unit,
a first cache related to the first processing unit,
a second cache related to the second processing unit,
a coherency unit, and
a monitor unit,
the computer program comprising a set of instructions, which, when executed, cause the cache-coherent multiprocessor system to perform the method comprising:
securing, by the coherency unit, the cache-coherency of the cache-coherent multiprocessor system,
determining, by the coherency unit, that a first copy of the at least one shared region stored in the first cache is altered,
updating, by the coherency unit, an original copy of the data stored in the shared region to match the altered first copy of data in response to the first copy being altered,
updating, by the coherency unit, a second copy of the data stored in the second cache to match the altered first copy of data and the updated original copy of the data in response to the first copy being altered, and
generating, by the monitor unit, an error signal, when the coherency unit affects the first region due to a memory access from the second processing unit and when the coherency unit affects the second region due to a memory access from the first processing unit.

15. The non-transitory, tangible computer-readable storage medium of claim 14, further comprising instructions to cause the cache-coherent multiprocessor system to perform the method comprising:
dynamically shifting, by at least one of the first processing unit and the second processing unit, a boundary of the shared region.

16. The method as claimed in one of claim 14, further comprising instructions to cause the cache-coherent multiprocessor system to perform the method comprising:
dynamically, by the first processing unit, shifting a boundary of the first region and a boundary of the second region.

17. The method as claimed in claim 14, further comprising instructions to cause the cache-coherent multiprocessor system to perform the method comprising:
altering, by the second processing unit, a boundary of the second region and a boundary of the first region.

18. The method as claimed in one of claim 14, further comprising instructions to cause the cache-coherent multiprocessor system to perform the method comprising:
the coherency unit, monitoring a rate of coherency operations.

19. The method as claimed in one of claim 14, further comprising instructions to cause the cache-coherent multiprocessor system to perform the method comprising:
executing, by the first processing unit, a first instance of software,
executing, by the second processing unit, a second instance of the software, and
validating the results between execution of both the first instance and the second instance.

* * * * *